Patented June 3, 1941

2,244,277

UNITED STATES PATENT OFFICE 2,244,277

SOLUTION OF MEDICINAL AGENTS AND SOLVENT THEREFOR

Wilhelm Wenner, Basel, Switzerland, assignor to Hoffmann-La Roche Inc., Nutley, N. J., a corporation of New Jersey No Drawing. Application December 19, 1938, Serial No. 246,755. In Germany January 10, 1938

2 Claims. (Cl. 167—74)

It has been found that 3,4-dimethoxy-benzyl alcohol (veratryl alcohol) can advantageously be used as a material for increasing the solubility in the manufacture of concentrated aqueous solutions of medicinal substances difficultly soluble or insoluble in water. Veratryl alcohol is miscible with water in all proportions and both in the pure state and in aqueous solution possesses a remarkable solvent capacity for compounds which as difficultly soluble or insoluble in water.

Veratryl alcohol has already been used as a fixative for perfumes (German patent specification 515,332). However, it could not be anticipated from such use that veratryl alcohol could be employed in the manufacture of aqueous solutions of medicinal substances difficultly soluble or insoluble in water.

Veratryl alcohol is characterised by low toxicity and by hardly any irritating effect so that solutions can be prepared therewith which are suitable for peroral, percutaneous of intravenous administration.

*Example 1*

By dissolving 2 parts by weight of oestrin in 1000 parts by weight of veratryl alcohol and addition of 9000 parts by weight of water, a sterilisable solution is obtained which is suitable for injection purposes.

*Example 2*

2 parts by weight of oestrin are dissolved in 500 parts by weight of veratryl alcohol. After cooling 450 parts by weight of water are added. A clear solution is obtained.

I claim:

1. As a new product a homogeneous liquid mixture comprising a difficultly soluble horme, 3,4-dimethoxy-benzyl alcohol and water.

2. As a new product a homogeneous liquid mixture comprising oestrin, 3,4-dimethoxy-benzyl alcohol and water.

WILHELM WENNER.

CERTIFICATE OF CORRECTION.

Patent No. 2,244,277. June 3, 1941.

WILHELM WENNER.

It is hereby certified that error appears in the printed specification of the above numbered patent requiring correction as follows: Second column, line 15, claim 1, for "horme" read --hormone--; and that the said Letters Patent should be read with this correction therein that the same may conform to the record of the case in the Patent Office.

Signed and sealed this 2nd day of September, A. D. 1941.

(Seal)

Henry Van Arsdale,
Acting Commissioner of Patents.